United States Patent
Shi et al.

(10) Patent No.: US 11,659,502 B2
(45) Date of Patent: *May 23, 2023

(54) METHOD FOR POWER CONTROL, AND TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,533

(22) Filed: Sep. 7, 2021

(65) Prior Publication Data

US 2021/0400603 A1    Dec. 23, 2021

Related U.S. Application Data

(63) Continuation of application No. 16/909,639, filed on Jun. 23, 2020, now Pat. No. 11,147,030, which is a
(Continued)

(51) Int. Cl.
*H04W 52/42* (2009.01)
*H04W 52/14* (2009.01)
*H04W 52/24* (2009.01)

(52) U.S. Cl.
CPC ......... *H04W 52/42* (2013.01); *H04W 52/146* (2013.01); *H04W 52/242* (2013.01)

(58) Field of Classification Search
CPC . H04W 52/42; H04W 52/146; H04W 52/242; H04W 52/26
See application file for complete search history.

(56) References Cited

U.S. PATENT DOCUMENTS

| 2014/0335868 A1 | 11/2014 | Kubota et al. |
| 2018/0332541 A1* | 11/2018 | Liu ..................... H04W 52/245 |

(Continued)

FOREIGN PATENT DOCUMENTS

| CN | 101527587 A | 9/2009 |
| CN | 102291811 A | 12/2011 |

(Continued)

OTHER PUBLICATIONS

Guangdong OPPO Mobile Telecommunications Corp. Ltd., International Search Report and Written Opinion, PCT/CN2018/072485, dated Sep. 30, 2018, 9 pgs.

(Continued)

*Primary Examiner* — John J Lee
(74) *Attorney, Agent, or Firm* — Morgan, Lewis & Bockius LLP

(57) ABSTRACT

Embodiments of this application disclose power control method, a terminal device, and a network device. The method includes: sending, by a network device, second information to a terminal device. The second information is used for the terminal device to determine a first downlink reference signal (DL RS) resource group corresponding to a first BWP according to a mapping relationship indicated by the second information, the second information indicates a mapping relationship between a BWP and a DL RS resource group. In the mapping relationship, one DL RS is configured for each BWP, a signal corresponding to a DL RS resource in the first DL RS resource group is used to determine a path loss value used by the terminal device to determine a transmit power for transmitting uplink data to be transmit-
(Continued)

ted, and the first DL RS resource group comprises at least one DL RS resource.

12 Claims, 3 Drawing Sheets

Related U.S. Application Data continuation of application No. PCT/CN2018/072485, filed on Jan. 12, 2018.

(56) References Cited

U.S. PATENT DOCUMENTS

| | | | |
|---|---|---|---|
| 2019/0261320 | A1 | 8/2019 | Yu et al. |
| 2020/0029291 | A1 | 1/2020 | Siomina |
| 2020/0068497 | A1 | 2/2020 | Gong et al. |
| 2020/0196263 | A1* | 6/2020 | Heyn ................. H04W 56/0045 |
| 2020/0266928 | A1* | 8/2020 | Yeo ....................... H04L 5/0092 |
| 2021/0227568 | A1* | 7/2021 | Harada ............. H04W 72/0453 |

FOREIGN PATENT DOCUMENTS

| | | |
|---|---|---|
| CN | 102845009 A | 12/2012 |
| CN | 102905302 A | 1/2013 |
| CN | 103298091 A | 9/2013 |
| CN | 104247525 A | 12/2014 |
| CN | 104871464 A | 8/2015 |
| CN | 106332253 A | 1/2017 |
| JP | 2017506440 A | 3/2017 |
| KR | 1020110069741 A | 6/2011 |
| WO | WO2013081368 A1 | 6/2013 |

OTHER PUBLICATIONS

Guangdong OPPO Mobile Telecommunications Corp. Ltd., Extended European Search Report, EP18900056.5, dated Dec. 4, 2020, 11 pgs.
Guangdong OPPO Mobile Telecommunications Corp. Ltd., First Office Action, CN202010393452.6, dated Jun. 2, 2021, 16 pgs.
Guangdong OPPO Mobile Telecommunications Corp. Ltd., Notification of Reasons for Refusal, KR10-2020-7022872, dated Jul. 12, 2021, 11 pgs.
Guangdong OPPO Mobile Telecommunications Corp., Ltd., Notice of Allowance, KR10-2020-7022872, dated Jan. 26, 2022, 3 pgs.
Guangdong OPPO Mobile Telecommunications Corp. Ltd., Notice of Priority Review of Patent Application, CN202010393452.6, dated May 18, 2021, 6 pgs.
Guangdong OPPO Mobile Telecommunications Corp., Ltd., Notice of Reasons for Refusal, JP2020-538708, dated Jan. 7, 2022, 6 pgs.
Guangdong OPPO Mobile Telecommunications Corp, Ltd., Examination Report, IN202017033619, dated Nov. 26, 2021, 6 pgs.
Interdigital, Inc., Remaining issues on beam management, 3GPP TSG RAN WG1, Meeting #91, Rl-1720630, Reno, USA, Nov. 27-Dec. 1, 2017, 13 pgs.
Media Tek, Inc., Summary of Bandwidth Part Operation, 3GPP TSG RAN WG1 Meeting 91, R1-1721504, Reno, USA, Nov. 27-Dec. 1, 2017, 13 pgs.
MediaTek et al., "Way Forward on bandwidth part in NR," 3GPP TSG-RAN WG1 #88bis, R1-1706745, Spokane, USA, Apr. 3-7, 2017, 2 pgs.
3GPP TS 38.213 V15.0.0, 3rd Generation Partnership Project; Technical Specification Group Radio Access Network; NR: Physical layer procedures for control (Release 15), (Dec. 2017), 56 pgs.
Nokia, Nokia Shanghai Bell, Remaining details on NR power control framework, 3GPP TSG RAN WG1, Meeting 91, R1-1721038, Reno, Nevada, USA, Nov. 27-Dec. 1, 2017, 7 pgs.
Shi, Preinterview First Office Action, U.S. Appl. No. 16/909,639, dated Mar. 18, 2021, 4 pgs.
Shi, Notice of Allowance, U.S. Appl. No. 16/909,639, dated Jun. 11, 2021, 8 pgs.
ZTE, Offline summary for AI 7.6 NR UL power control, 3GPP TSG RAN WG1 Meeting #90bis, R1-1718883, Prague, Czechia, Oct. 9-13, 2017, 21 pgs.
Guangdong OPPO Mobile Telecommunications Corp, Ltd., Decision to Grant a Patent, JP2020-538708, dated Aug. 5, 2022.

\* cited by examiner

METHOD FOR POWER CONTROL, AND TERMINAL DEVICE AND NETWORK DEVICE

CROSS-REFERENCE TO RELATED APPLICATION

This application is continuation of U.S. patent application Ser. No. 16/909,639, entitled "METHOD FOR POWER CONTROL, AND TERMINAL DEVICE AND NETWORK DEVICE" filed Jun. 23, 2020, which is a continuation of PCT Application No. PCT/CN2018/072485, entitled "METHOD FOR POWER CONTROL, AND TERMINAL DEVICE AND NETWORK DEVICE" filed Jan. 12, 2018, the entire content of both of which is incorporated herein by reference.

TECHNICAL FIELD

This application relates to the communications field, and more specifically, to a power control method, a terminal device, and a network device.

BACKGROUND

In an existing New Radio (NR) design, when multiple beams are not supported in uplink transmission of user equipment (UE), a network configures only one downlink reference signal (DL RS) for the UE to estimate a path loss in uplink transmission. However, a network device may configure a plurality of bandwidth parts (BWP) for the UE and may use signaling to instruct the UE to dynamically perform transmission on different BWPs. In this case, the same DL RS is used to estimate a path loss in uplink transmission when a terminal device switches to any of the BWPs. As a result, the estimated path loss in uplink transmission is prone to significant errors, causing degraded system performance.

SUMMARY

In view of this, embodiments of this application provide a power control method, a terminal device, and a network device, which help to improve the accuracy of power control, thereby improving system performance.

According to a first aspect, a power control method is provided. The method includes: determining, by a terminal device, a first DL RS resource group corresponding to a first BWP, where the first DL RS resource group includes at least one DL RS resource; and determining, by the terminal device according to a signal corresponding to the DL RS resource in the first DL RS resource group, a path loss value used to calculate a transmit power for to-be-transmitted uplink data.

A corresponding DL RS resource group is configured for each BWP, so that the terminal device can estimate a path loss in uplink transmission more adequately, which helps to improve the accuracy of power control, thereby improving system performance.

In a possible implementation, the determining, by a terminal device, a first DL RS resource group corresponding to a first BWP includes: determining, by the terminal device, the first DL RS resource group corresponding to the first BWP according to a mapping relationship between a BWP and a DL RS resource group.

The terminal device may determine a DL RS resource group on a corresponding BWP according to the mapping relationship between a BWP and a DL RS resource group, so that the terminal device can flexibly use an appropriate DL RS resource group to estimate a path loss in uplink transmission during dynamic switching between BWPs.

In a possible implementation, the mapping relationship includes a correspondence between K DL RS resource groups and X downlink BWPs (DL BWPs), K and X are both positive integers greater than 1, and K is less than or equal to X.

In a possible implementation, the mapping relationship includes a correspondence between M DL RS resource groups and Y uplink BWPs (UL BWPs), and M and Y are both positive integers greater than 1.

In a possible implementation, the method further includes: receiving, by the terminal device, first information sent by a network device, where the first information is used to instruct to activate the first BWP; and the determining, by the terminal device, the first DL RS resource group corresponding to the first BWP according to a mapping relationship between a BWP and a DL RS resource group includes: determining, by the terminal device, the first DL RS resource group corresponding to the first BWP according to the mapping relationship and the first BWP.

In a possible implementation, the first information is carried in higher layer signaling, media access control (MAC) control element (CE) signaling or downlink control information (DCI).

In a possible implementation, the method further includes: receiving, by the terminal device, second information sent by the network device, where the second information is used to indicate the mapping relationship.

In a possible implementation, the second information is carried in higher layer signaling, MAC CE signaling or DCI.

In a possible implementation, before the determining, by a terminal device, a first DL RS resource group corresponding to a first BWP, the method further includes: receiving, by the terminal device, third information sent by a network device, where the third information is used to indicate the first DL RS resource group corresponding to the first BWP to be activated; and the determining, by a terminal device, a first DL RS resource group corresponding to a first BWP includes: determining, by the terminal device, the first DL RS resource group corresponding to the first BWP according to the third information.

In a possible implementation, the third information is carried in higher layer signaling, MAC CE signaling or DCI used to instruct to activate the first BWP.

In a possible implementation, the DL RS resource includes a channel state information-reference signal (CSI-RS) resource and/or a synchronization signal/physical broadcast channel (SS/PBCH) block.

In a possible implementation, the method further includes: determining, by the terminal device, the transmit power for the to-be-transmitted uplink data according to the path loss value; and sending, by the terminal device, the to-be-transmitted uplink data according to the transmit power.

According to a second aspect, a power control method is provided. The method includes: sending, by a network device, first information to a terminal device, where the first information is used for the terminal device to determine a first DL RS resource group corresponding to a first BWP, a signal corresponding to a DL RS resource in the first DL RS resource group is used to determine a path loss value used by the terminal device to calculate a transmit power for to-be-transmitted uplink data, and the first DL RS resource group includes at least one DL RS resource.

In a possible implementation, the first information is a mapping relationship between a BWP and a DL RS resource group.

In a possible implementation, the mapping relationship includes a correspondence between K DL RS resource groups and X DL BWPs, K and X are both positive integers greater than 1, and K is less than or equal to X.

In a possible implementation, the mapping relationship includes a correspondence between M DL RS resource groups and Y UL BWPs, and M and Y are both positive integers greater than 1.

In a possible implementation, the method further includes: sending, by the network device, second information to the terminal device, where the second information is used to instruct to activate the first BWP.

In a possible implementation, the second information is carried in higher layer signaling, MAC CE signaling or DCI.

In a possible implementation, the first information is carried in higher layer signaling, MAC CE signaling or DCI.

In a possible implementation, the first information is used to indicate the first DL RS resource group corresponding to the first BWP to be activated.

In a possible implementation, the first information is carried in higher layer signaling, MAC CE signaling or DCI used to instruct to activate the first BWP.

In a possible implementation, the DL RS resource includes a CSI-RS resource and/or an SS/PBCH block.

According to a third aspect, a terminal device is provided. The terminal device is configured to perform the method according to any one of the first aspect or the possible implementations of the first aspect. Specifically, the terminal device includes units configured to perform the method according to any one of the first aspect or the possible implementations of the first aspect.

According to a fourth aspect, a network device is provided. The network device is configured to perform the method according to any one of the second aspect or the possible implementations of the second aspect. Specifically, the network device includes units configured to perform the method according to any one of the second aspect or the possible implementations of the second aspect.

According to a fifth aspect, a terminal device is provided. The terminal device includes a memory, a processor, an input interface, and an output interface. The memory, the processor, the input interface, and the output interface are connected by a bus system. The memory is configured to store an instruction, and the processor is configured to execute the instruction stored in the memory to perform the method according to any one of the first aspect or the possible implementations of the first aspect.

According to a sixth aspect, a network device is provided. The network device includes a memory, a processor, an input interface, and an output interface. The memory, the processor, the input interface, and the output interface are connected by a bus system. The memory is configured to store an instruction, and the processor is configured to execute the instruction stored in the memory to perform the method according to any one of the second aspect or the possible implementations of the second aspect.

According to a seventh aspect, a computer storage medium is provided, configured to store a computer software instruction for performing the method according to any one of the first aspect or the possible implementations of the first aspect or the method according to any one of the second aspect or the possible implementations of the second aspect, where the computer storage medium includes a program designed to perform the foregoing aspects.

According to an eighth aspect, a computer program product including an instruction is provided, where when the computer program product is run on a computer, the computer is enabled to perform the method according to any one of the first aspect or the possible implementations of the first aspect or the method according to any one of the second aspect or the possible implementations of the second aspect.

In this application, names of the terminal device, the network device, and the like do not constitute limitations to devices, and in actual implementation, the devices may appear with other names. As long as functions of each device are similar to those in this application, the devices shall fall within the scope of the claims of this application and equivalent technologies of the claims of this application.

These aspects or other aspects of this application are simpler and more comprehensible in descriptions of the following embodiments.

DETAILED DESCRIPTION

Figure 1:
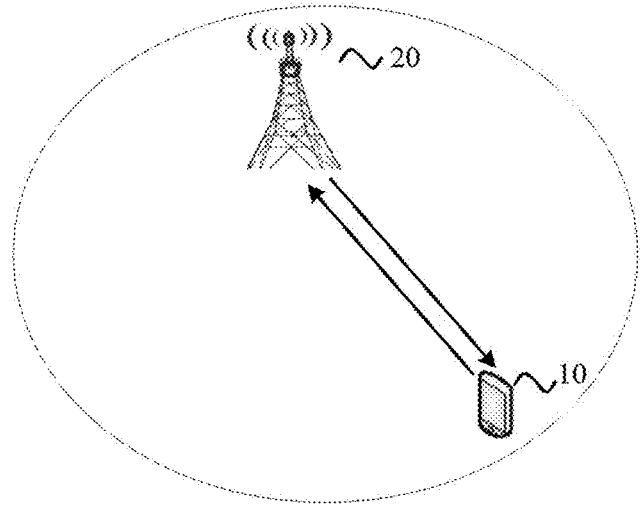
FIG. 1 is a schematic diagram of an application scenario according to an embodiment of this application.

The technical solutions in the embodiments of this application are described clearly and completely below with reference to the accompanying drawings in the embodiments of this application.

It should be understood that the technical solutions of the embodiments of this application may be applied to various communications systems, such as: a Global System for Mobile Communications (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunications System (UMTS), a Worldwide Interoperability for Microwave Access (WiMAX) communications system, an NR system, and a future 5G system.

Particularly, the technical solutions of the embodiments of this application may be applied to various communications systems based on a Non-Orthogonal Multiple Access technology, for example, a Sparse Code Multiple Access (SCMA) system and a Low Density Signature (LDS) system. Certainly, the SCMA system and the LDS system may also be referred to as other names in the communications field. Further, the technical solutions of the embodiments of this application may be applied to multi-carrier transmission systems in which the Non-Orthogonal Multiple Access technology is used, for example, an Orthogonal Frequency Division Multiplexing (OFDM) system, a Filter Bank Multi-Carrier (FBMC) system, a Generalized Frequency Division Multiplexing (GFDM) system, and a filtered-Orthogonal Frequency Division Multiplexing (F-OFDM) system in which the Non-Orthogonal Multiple Access technology is used.

A terminal device in the embodiments of this application may be UE, an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like. This is not limited in the embodiments of this application.

In the embodiments of this application, a network device may be a device configured to communicate with the terminal device. The network device may be a base transceiver station (BTS) in GSM or in CDMA, a NodeB (NB) in a WCDMA system, an evolved NodeB (eNB or eNodeB) in an LTE system, or a wireless controller in a cloud radio access network (CRAN) scenario. Alternatively, the network device may be a relay station, an access point, an in-vehicle device, a wearable device, a network device in a future 5G network, a network device in a future evolved PLMN network, or the like. This is not limited in the embodiments of this application.

FIG. 1 is a schematic diagram of an application scenario according to an embodiment of this application. A communications system in FIG. 1 may include a terminal device 10 and a network device 20. The network device 20 is configured to provide a communications service to the terminal device 10 and connect to a core network. The terminal device 10 is connected to a network by searching for a synchronization signal, a broadcast signal, and the like sent by the network device 20, to communicate with the network. An arrow shown in FIG. 1 may indicate an uplink/downlink transmission over a cellular link between the terminal device 10 and the network device 20.

In a current NR design, when different beams are supported in uplink transmission of UE, a network merely configure DL RSs corresponding to the different beams for the UE, so that when performing uplink transmission through the different beams, a terminal device can estimate a path loss according to each corresponding DL RS. If multiple beams are not supported in uplink transmission of the UE, the network configures only one DL RS for the UE.

In an NR, the network may configure a plurality of DL BWPs or UL BWPs for the UE, and the network may instruct to perform relatively dynamically transmission on different BWPs in a manner such as DCI or MAC CE. If the same DL RS is still used to estimate a path loss in uplink transmission after switching between BWPs, a significant error may occur, and consequently a calculated transmit power is inaccurate. In this case, a method is needed to obtain a relatively appropriate DL RS for estimating a path loss after the terminal device switches between BWPs.

Figure 2:
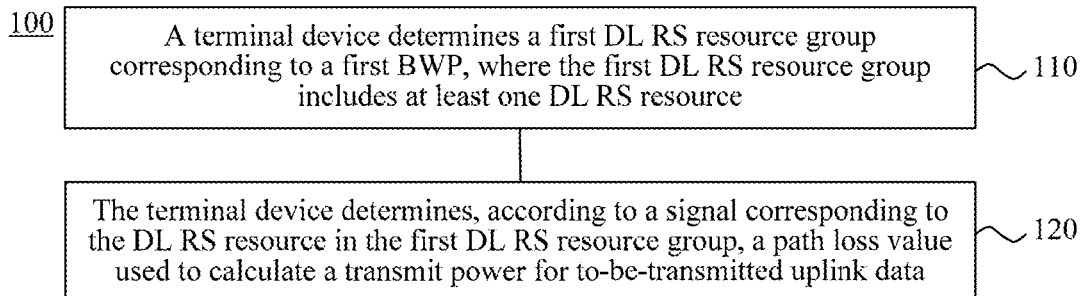
FIG. 2 is a schematic block diagram of an uplink power method according to an embodiment of this application.

FIG. 2 is a schematic block diagram of a power control method 100 according to an embodiment of this application. As shown in FIG. 2, the method 100 includes some or all of the following content.

S110: A terminal device determines a first DL RS resource group corresponding to a first BWP, where the first DL RS resource group includes at least one DL RS resource.

S120: The terminal device determines, according to a signal corresponding to the DL RS resource in the first DL RS resource group, a path loss value used to calculate a transmit power for to-be-transmitted uplink data.

Specifically, a network device may configure K DL RS resource groups for the terminal device. Each DL RS resource group may include at least one DL RS. A quantity of DL RSs included in each DL RS may be the same as a quantity of beams supported by the terminal device. For example, if the terminal device does not support multiple beams, each DL RS resource group includes one DL RS resource, and if the terminal device supports N beams, where N is a positive integer greater than 1, each DL RS resource group includes N DL RS resources. The network device may correlate a DL BWP or a UL BWP configured for the terminal device to some or all of the K DL RS resource groups. In this way, the terminal device can obtain a DL RS resource group corresponding to a corresponding BWP, and further determine a path loss value in uplink transmission by using a corresponding signal in the DL RS resource in the determined DL RS resource group.

Therefore, the power control method of this embodiment of this application helps to improve the accuracy of power control, thereby improving system performance.

Optionally, in this embodiment of this application, the determining, by a terminal device, a first DL RS resource group corresponding to a first BWP includes: determining, by the terminal device, the first DL RS resource group corresponding to the first BWP according to a mapping relationship between a BWP and a DL RS resource group.

The terminal device may store the mapping relationship between a BWP and a DL RS resource group in advance. Specifically, the mapping relationship may be configured by the network device, or may be stipulated by a protocol, that is, the mapping relationship may be stored in an internal storage module of the terminal device at delivery. When the terminal device needs to switch to a BWP, the terminal device may search the mapping relationship for a DL RS resource group corresponding to the BWP to which the terminal device is to switch, and further estimate a path loss in uplink transmission.

The terminal device may determine a DL RS resource group on a corresponding BWP according to the mapping relationship between a BWP and a DL RS resource group, so that the terminal device can flexibly use an appropriate DL RS resource group to estimate a path loss in uplink transmission during dynamic switching between BWPs.

It should be understood that, the mapping relationship may be a correspondence between a DL BWP and a DL RS resource group, or may be a correspondence between a UL BWP and a DL RS resource group, or may be a correspondence among a DL BWP, a UL BWP, and a DL RS. A type of the BWP is not limited in the embodiments of this application.

It should be further understood that, a quantity of the DL RS resource groups configured by the network device for the terminal device should not be greater than a quantity of the DL BWPs configured for the terminal device. However, the quantity of the DL RS resource groups configured by the network device for the terminal device may not be a quantity of the UL BWPs configured for the terminal device.

Optionally, in this embodiment of this application, the method further includes: receiving, by the terminal device, first information sent by a network device, where the first information is used to instruct to activate the first BWP; and the determining, by the terminal device, the first DL RS resource group corresponding to the first BWP according to a mapping relationship between a BWP and a DL RS resource group includes: determining, by the terminal device, the first DL RS resource group corresponding to the first BWP according to the mapping relationship and the first BWP.

Specifically, the network device may use higher layer signaling, MAC CE signaling or DCI to instruct the terminal device to activate a BWP. The BWP may be a DL BWP or a UL BWP, and the higher layer signaling may be, for example, Radio Resource Control (RRC) signaling.

Optionally, if the mapping relationship is configured by the network device for the terminal device, the network device may also use higher layer signaling, MAC CE signaling or DCI to instruct the terminal device.

As an alternative embodiment, before the determining, by a terminal device, a first DL RS resource group corresponding to a first BWP, the method further includes: receiving, by the terminal device, third information sent by a network device, where the third information is used to indicate the first DL RS resource group corresponding to the first BWP to be activated; and the determining, by a terminal device, a first DL RS resource group corresponding to a first BWP includes: determining, by the terminal device, the first DL RS resource group corresponding to the first BWP according to the third information.

That is, the network device may not store the mapping relationship between a BWP and a DL RS resource group for the terminal device in advance, and the network device may configure the DL RS resource group corresponding to the BWP for the terminal device when instructing the terminal device to switch between BWPs. For example, if the network device instructs to activate a BWP1, the network device may combine the BWP1 to configure a DL RS resource group suitable for the BWP1 for the terminal device, and indicate the DL RS resource group to the terminal device. Further, the terminal device may estimate a path loss in uplink transmission according to a signal corresponding to a DL RS resource in the indicated DL RS resource group.

Further, the network device may activate a BWP while indicating a DL RS resource group corresponding to the BWP. For example, the network device may use same higher layer signaling, MAC CE signaling or DCI to both instruct the terminal device to activate a BWP and indicate a DL RS resource group corresponding to the BWP to the terminal device. The network device may separately instruct the terminal device to activate a BWP and indicate a DL RS resource group corresponding to the BWP to the terminal device. This is not limited in the embodiments of this application.

It should be understood that, before the network device indicates the DL RS resource group corresponding to the BWP, the terminal device needs to estimate a path loss by using a previous DL RS resource group.

It should be further understood that, the DL RS resource in this embodiment of this application may include a CSI-RS resource and/or an SS/PBCH Block.

Further, after the terminal device determines the path loss value, the method may further include: determining, by the terminal device, the transmit power for the to-be-transmitted uplink data according to the path loss value; and sending, by the terminal device, the to-be-transmitted uplink data according to the transmit power.

It should be understood that, the first information, the second information and the third information in this specification may be carried in same signaling in any combination. This is not limited in the embodiments of this application.

Figure 3:
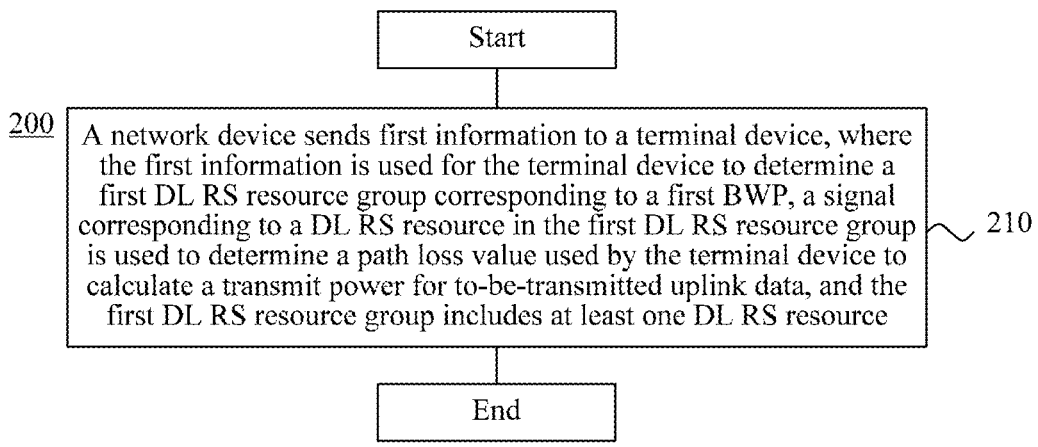
FIG. 3 is another schematic block diagram of an uplink power method according to an embodiment of this application.

FIG. 3 is a schematic block diagram of a power control method 200 according to an embodiment of this application. As shown in FIG. 3, the method 200 includes some or all of the following content.

S210: A network device sends first information to a terminal device, where the first information is used for the terminal device to determine a first DL RS resource group corresponding to a first BWP, a signal corresponding to a DL RS resource in the first DL RS resource group is used to determine a path loss value used by the terminal device to calculate a transmit power for to-be-transmitted uplink data, and the first DL RS resource group includes at least one DL RS resource.

Therefore, the power control method of this embodiment of this application helps to improve the accuracy of power control, thereby improving system performance.

Optionally, in this embodiment of this application, the first information is a mapping relationship between a BWP and a DL RS resource group.

Optionally, in this embodiment of this application, the mapping relationship includes a correspondence between K DL RS resource groups and X DL BWPs, K and X are both positive integers greater than 1, and K is less than or equal to X.

Optionally, in this embodiment of this application, the mapping relationship includes a correspondence between M DL RS resource groups and Y UL BWPs, and M and Y are both positive integers greater than 1.

Optionally, in this embodiment of this application, the method further includes: sending, by the network device, second information to the terminal device, where the second information is used to instruct to activate the first BWP.

Optionally, in this embodiment of this application, the second information is carried in higher layer signaling, MAC CE signaling or DCI.

Optionally, in this embodiment of this application, the first information is carried in higher layer signaling, MAC CE signaling or DCI.

Optionally, in this embodiment of this application, the first information is used to indicate the first DL RS resource group corresponding to the first BWP to be activated.

Optionally, in this embodiment of this application, the first information is carried in higher layer signaling, MAC CE signaling or DCI used to instruct to activate the first BWP.

Optionally, in this embodiment of this application, the DL RS resource includes a CSI-RS resource and/or an SS/PBCH block.

It should be understood that, the terms "system" and "network" in this specification are usually interchangeably used in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, interaction between the network device and the terminal device and related characteristics, functions, and the like described for the network device correspond to related characteristics and functions of the terminal device. Moreover, related content has been described in detail in the foregoing method 100. For brevity, details are not described herein again.

It should be understood that sequence numbers of the foregoing processes do not mean execution sequences in various embodiments of this application. The execution sequences of the processes should be determined according to functions and internal logic of the processes, and should not be construed as any limitation to the implementation processes of the embodiments of this application.

The power control methods according to the embodiments of this application are described above in detail, the apparatuses according to the embodiments of this application are described below with reference to FIG. 4 to FIG. 7, and the technical characteristics described in the method embodiments are applicable to the following apparatus embodiments.

Figure 4:
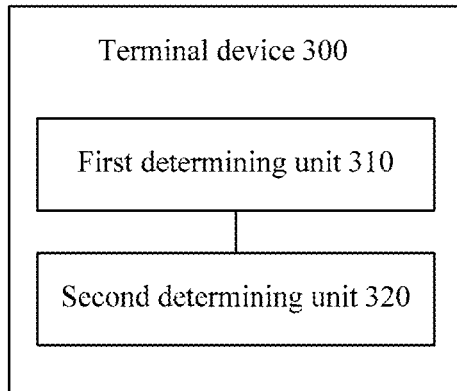
FIG. 4 is a schematic block diagram of a terminal device according to an embodiment of this application.

FIG. 4 is a schematic block diagram of a terminal device 300 according to an embodiment of this application. As shown in FIG. 4, the terminal device 300 includes:

a first determining unit 310, configured to determine a first DL RS resource group corresponding to a first BWP, where the first DL RS resource group includes at least one DL RS resource; and a second determining unit 320, configured to determine, according to a signal corresponding to the DL RS resource in the first DL RS resource group, a path loss value used to calculate a transmit power for to-be-transmitted uplink data.

Therefore, the terminal device of this embodiment of this application helps to improve the accuracy of power control, thereby improving system performance.

Optionally, in this embodiment of this application, the first determining unit is specifically configured to determine the first DL RS resource group corresponding to the first BWP according to a mapping relationship between a BWP and a DL RS resource group.

Optionally, in this embodiment of this application, the mapping relationship includes a correspondence between K DL RS resource groups and X DL BWPs, K and X are both positive integers greater than 1, and K is less than or equal to X.

Optionally, in this embodiment of this application, the mapping relationship includes a correspondence between M DL RS resource groups and Y UL BWPs, and M and Y are both positive integers greater than 1.

Optionally, in this embodiment of this application, the terminal device further includes a first receiving unit, configured to receive first information sent by a network device, where the first information is used to instruct to activate the first BWP; and the first determining unit is specifically configured to determine the first DL RS resource group corresponding to the first BWP according to the mapping relationship and the first BWP.

Optionally, in this embodiment of this application, the first information is carried in higher layer signaling, MAC CE signaling or DCI.

Optionally, in this embodiment of this application, the terminal device further includes a second receiving unit, configured to receive second information sent by the network device, where the second information is used to indicate the mapping relationship.

Optionally, in this embodiment of this application, the second information is carried in higher layer signaling, MAC CE signaling or DCI.

Optionally, in this embodiment of this application, before the terminal device determines the first DL RS resource group corresponding to the first BWP, the terminal device further includes a third receiving unit, configured to receive third information sent by a network device, where the third information is used to indicate the first DL RS resource group corresponding to the first BWP to be activated; and the first determining unit is specifically configured to determine the first DL RS resource group corresponding to the first BWP according to the third information.

Optionally, in this embodiment of this application, the third information is carried in higher layer signaling, MAC CE signaling or DCI used to instruct to activate the first BWP.

Optionally, in this embodiment of this application, the DL RS resource includes a CSI-RS resource and/or an SS/PBCH block.

Optionally, in this embodiment of this application, the terminal device further includes: a third determining unit, configured to determine the transmit power for the to-be-transmitted uplink data according to the path loss value; and a sending unit, configured to send the to-be-transmitted uplink data according to the transmit power.

It should be understood that, the terminal device 300 according to this embodiment of this application may correspond to the terminal device in the method embodiments of this application, and the foregoing and other operations and/or functions of the units in the terminal device 300 are respectively used to implement corresponding procedures of the terminal device in the method in FIG. 2. For brevity, details are not described herein again.

Figure 5:
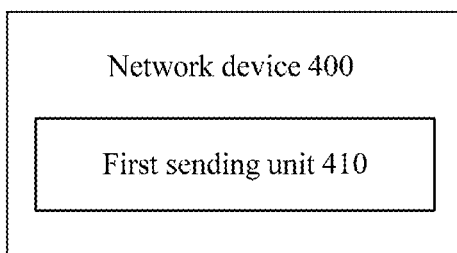
FIG. 5 is a schematic block diagram of a network device according to an embodiment of this application.

FIG. 5 is a schematic block diagram of a network device 400 according to an embodiment of this application. As shown in FIG. 5, the network device 400 includes:

a first sending unit 410, configured to send first information to a terminal device, where the first information is used for the terminal device to determine a first DL RS resource group corresponding to a first BWP, a signal corresponding to a DL RS resource in the first DL RS resource group is used to determine a path loss value used by the terminal device to calculate a transmit power for to-be-transmitted uplink data, and the first DL RS resource group includes at least one DL RS resource.

Therefore, the network device of this embodiment of this application helps to improve the accuracy of power control, thereby improving system performance.

Optionally, in this embodiment of this application, the first information is a mapping relationship between a BWP and a DL RS resource group.

Optionally, in this embodiment of this application, the mapping relationship includes a correspondence between K DL RS resource groups and X DL BWPs, K and X are both positive integers greater than 1, and K is less than or equal to X.

Optionally, in this embodiment of this application, the mapping relationship includes a correspondence between M DL RS resource groups and Y UL BWPs, and M and Y are both positive integers greater than 1.

Optionally, in this embodiment of this application, the network device further includes a second sending unit, configured to send second information to the terminal device, where the second information is used to instruct to activate the first BWP.

Optionally, in this embodiment of this application, the second information is carried in higher layer signaling, MAC CE signaling or DCI.

Optionally, in this embodiment of this application, the first information is carried in higher layer signaling, MAC CE signaling or DCI.

Optionally, in this embodiment of this application, the first information is used to indicate the first DL RS resource group corresponding to the first BWP to be activated.

Optionally, in this embodiment of this application, the first information is carried in higher layer signaling, MAC CE signaling or DCI used to instruct to activate the first BWP.

Optionally, in this embodiment of this application, the DL RS resource includes a CSI-RS resource and/or an SS/PBCH block.

It should be understood that, the network device 400 in this embodiment of this application may correspond to the network device in the method embodiments of this application, and the foregoing operations and/or functions and other operations and/or functions of the units in the network device 400 are respectively for implementing corresponding procedures of the network device in the method shown in FIG. 3. For brevity, details are not described herein again.

Figure 6:
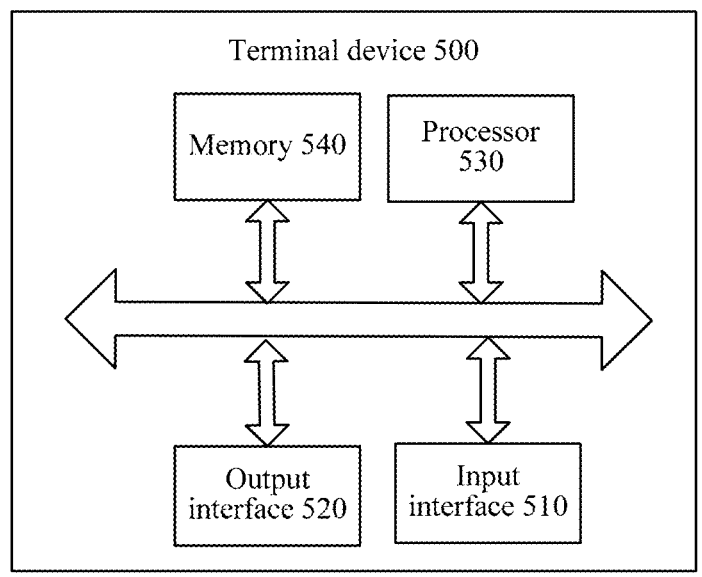
FIG. 6 is another schematic block diagram of a terminal device according to an embodiment of this application.

As shown in FIG. 6, an embodiment of this application further provides a terminal device 500. The terminal device 500 may be the terminal device 300 in FIG. 4, and can be configured to perform content of the terminal device corresponding to the method 100 in FIG. 2. The terminal device 500 includes an input interface 510, an output interface 520, a processor 530, and a memory 540. The input interface 510, the output interface 520, the processor 530, and the memory 540 may be connected by a bus system. The memory 540 is configured to store a program, an instruction, or a code. The processor 530 is configured to execute the program, the instruction, or the code in the memory 540, so as to control the input interface 510 to receive a signal, control the output interface 520 to send a signal, and complete operations in the foregoing method embodiments.

Therefore, the terminal device of this embodiment of this application helps to improve the accuracy of power control, thereby improving system performance.

It should be understood that, in this embodiment of this application, the processor 530 may be a central processing unit (CPU), or the processor 530 may be another general purpose processor, a digital signal processor (DSP), an application specific integrated circuit (ASIC), a field programmable gate array (FPGA), or another programmable logical device, discrete gate or transistor logic device, or discrete hardware component, or the like. The general purpose processor may be a microprocessor or the processor may be any conventional processor or the like.

The memory 540 may include a read-only memory (ROM) and a random access memory (RAM), and provide an instruction and data to the processor 530. A part of the memory 540 may further include a non-volatile RAM. For example, the memory 540 may further store information of a device type.

In an implementation process, each piece of content of the foregoing methods may be implemented by a hardware-integrated logic circuit in the processor 530 or by an instruction in a software form. The content of the method disclosed with reference to the embodiments of this application may be directly performed by a hardware processor, or may be performed by using a combination of hardware in the processor and a software module. The software module may be located in a mature storage medium in the field, such as a RAM, a flash memory, a ROM, a programmable ROM, an electrically-erasable programmable memory, or a register. The storage medium is located in the memory 540, and the processor 530 reads information in the memory 540 and completes the content in the foregoing methods in combination with hardware of the processor. To avoid repetition, details are not described herein again.

In a specific implementation, the first determining unit, the second determining unit, and the third determining unit in the terminal device 300 may be implemented by the processor 530 in FIG. 6, the sending unit of the terminal device 300 may be implemented by the output interface 520 in FIG. 6, and the first receiving unit, the second receiving unit, and the third receiving unit of the terminal device 300 may be implemented by the input interface 510 in FIG. 6.

Figure 7:
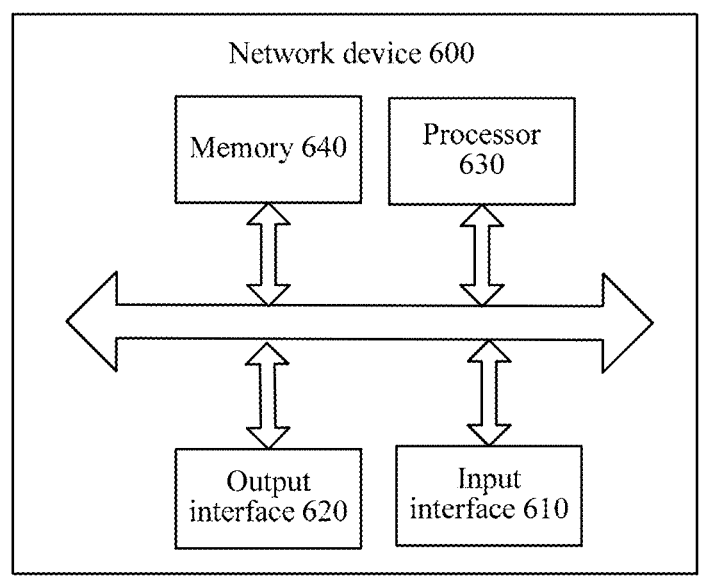
FIG. 7 is another schematic block diagram of a network device according to an embodiment of this application.

As shown in FIG. 7, an embodiment of this application further provides a network device 600. The network device 600 may be the network device 400 in FIG. 5, and can be configured to perform content of the network device corresponding to the method 200 in FIG. 3. The network device 600 includes an input interface 610, an output interface 620, a processor 630, and a memory 640. The input interface 610, the output interface 620, the processor 630, and the memory 640 may be connected by a bus system. The memory 640 is configured to store a program, an instruction, or a code. The processor 630 is configured to execute the program, the instruction, or the code in the memory 640, so as to control the input interface 610 to receive a signal, control the output interface 620 to send a signal, and complete operations in the foregoing method embodiment.

Therefore, the network device of this embodiment of this application helps to improve the accuracy of power control, thereby improving system performance.

It should be understood that, in this embodiment of this application, the processor 630 may be a CPU, or the processor 630 may be another general purpose processor, a DSP, an ASIC, an FPGA, or another programmable logical device, discrete gate or transistor logic device, or discrete hardware component, or the like. The general purpose processor may be a microprocessor or the processor may be any conventional processor or the like.

The memory 640 may include a ROM and a RAM, and provide an instruction and data to the processor 630. A part of the memory 640 may further include a non-volatile RAM. For example, the memory 640 may further store information of a device type.

In an implementation process, each piece of content of the foregoing methods may be implemented by a hardware-integrated logic circuit in the processor 630 or by an instruction in a software form. The content of the method disclosed with reference to the embodiments of this application may be directly performed by a hardware processor, or may be performed by using a combination of hardware in the processor and a software module. The software module may be located in a mature storage medium in the field, such as a RAM, a flash memory, a ROM, a programmable ROM, an electrically-erasable programmable memory, or a register. The storage medium is located in the memory 640, and the processor 630 reads information in the memory 640 and completes the content in the foregoing methods in combination with hardware of the processor. To avoid repetition, details are not described herein again.

In a specific implementation, the first sending unit and the second sending unit in the network device 400 may be implemented by the output interface 620 in FIG. 7.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to corresponding processes in the foregoing method embodiments, and details are not described herein again.

In the several embodiments provided in this application, it should be understood that the disclosed systems, apparatuses, and methods may be implemented in other manners. For example, the described apparatus embodiments are merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or a part of the steps of the embodiments of this application. The foregoing storage medium includes: any medium that can store program codes, such as a Universal Serial Bus (USB) flash disk, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power control method, applied in a system comprising a plurality of bandwidth parts (BWPs), the method comprising:
   sending, by a network device, second information to a terminal device, wherein the second information is used for the terminal device to determine a first downlink reference signal (DL RS) resource group corresponding to a first BWP according to a mapping relationship indicated by the second information, wherein the second information is used to indicate a mapping relationship between a BWP and a DL RS resource group, and in the mapping relationship, one DL RS resource group is configured for each BWP, a signal corresponding to a DL RS resource in the first DL RS resource group is used to determine a path loss estimation used by the terminal device to determine a transmit power for transmitting uplink data to be transmitted, and the first DL RS resource group comprises at least one DL RS resource.

2. The method according to claim 1, wherein the mapping relationship comprises a correspondence between M DL RS resource groups and Y uplink BWPs (UL BWPs), and M and Y are both positive integers greater than 1.

3. The method according to claim 1, wherein the method further comprises:
   sending, by the network device, first information to the terminal device, wherein the first information is used to instruct to activate the first BWP.

4. The method according to claim 3, wherein the first information is carried in higher layer signaling, media access control (MAC) control element (CE) signaling or downlink control information (DCI).

5. The method according to claim 1, wherein the second information is carried in higher layer signaling, MAC CE signaling or DCI.

6. The method according to claim 1, wherein the DL RS resource comprises a channel state information-reference signal (CSI-RS) resource and/or a synchronization signal/physical broadcast channel (SS/PBCH) block.

7. A network device, applied in a system comprising a plurality of bandwidth parts (BWPs), comprising:
   a processor;
   memory for storing instructions executable by the processor;
   wherein the processor is configured to:
      send second information to a terminal device, wherein the second information is used for the terminal device to determine a first downlink reference signal (DL RS) resource group corresponding to a first BWP according to a mapping relationship indicated by the second information, wherein the second information is used to indicate a mapping relationship between a BWP and a DL RS resource group, and in the mapping relationship, one DL RS resource group is configured for each BWP, a signal corresponding to a DL RS resource in the first DL RS resource group is used to determine a path loss estimation used by the terminal device to determine a transmit power for transmitting uplink data to be transmitted, and the first DL RS resource group comprises at least one DL RS resource.

8. The network device according to claim 7, wherein the mapping relationship comprises a correspondence between M DL RS resource groups and Y uplink BWPs (UL BWPs), and M and Y are both positive integers greater than 1.

9. The network device according to claim 7, wherein the processor is further configured to:
   send first information to the terminal device, wherein the first information is used to instruct to activate the first BWP.

10. The network device according to claim 9, wherein the first information is carried in higher layer signaling, media access control (MAC) control element (CE) signaling or downlink control information (DCI).

11. The network device according to claim 7, wherein the second information is carried in higher layer signaling, MAC CE signaling or DCI.

12. The network device according to claim 7, wherein the DL RS resource comprises a channel state information-reference signal (CSI-RS) resource and/or a synchronization signal/physical broadcast channel (SS/PBCH) block.

\* \* \* \* \*